United States Patent
Audet

(10) Patent No.: US 11,281,841 B2
(45) Date of Patent: Mar. 22, 2022

(54) AXIS OF USER-SELECTABLE ELEMENTS WITH LINEAR TIMESCALE AND NON-LINEAR TIMESCALE

(71) Applicant: 9224-5489 QUEBEC INC., Sherbrooke (CA)

(72) Inventor: Mathieu Audet, Orford (CA)

(73) Assignee: 9224-5489 QUEBEC Inc., Sherbrooke (CA)

( * ) Notice: Subject to any disclaimer, the term of this patent is extended or adjusted under 35 U.S.C. 154(b) by 0 days.

(21) Appl. No.: 16/900,939

(22) Filed: Jun. 14, 2020

(65) Prior Publication Data

US 2020/0311335 A1    Oct. 1, 2020

Related U.S. Application Data

(63) Continuation of application No. 16/543,566, filed on Aug. 18, 2019, now Pat. No. 10,719,658, which is a
(Continued)

(51) Int. Cl.
| | |
|---|---|
| *G06F 40/103* | (2020.01) |
| *G06F 3/0481* | (2013.01) |
| *G06F 16/29* | (2019.01) |
| *G06F 16/34* | (2019.01) |
| *G06F 16/93* | (2019.01) |
| *G06F 3/0482* | (2013.01) |
| *G06F 3/0485* | (2013.01) |
| *G06F 3/0484* | (2013.01) |
| *G06Q 10/10* | (2012.01) |
| *G06F 16/904* | (2019.01) |
| *G06F 3/04815* | (2022.01) |

(Continued)

(52) U.S. Cl.
CPC .......... *G06F 40/103* (2020.01); *G06F 3/0482* (2013.01); *G06F 3/0485* (2013.01); *G06F 3/04815* (2013.01); *G06F 3/04817* (2013.01); *G06F 3/04842* (2013.01); *G06F 16/29* (2019.01); *G06F 16/34* (2019.01); *G06F 16/93* (2019.01); *G06F 16/904* (2019.01); *G06Q 10/109* (2013.01)

(58) Field of Classification Search
None
See application file for complete search history.

(56) References Cited

U.S. PATENT DOCUMENTS

| | | | | |
|---|---|---|---|---|
| 5,623,588 | A * | 4/1997 | Gould | G06F 3/04855 345/157 |
| 7,218,325 | B1 * | 5/2007 | Buck | G06Q 30/06 345/440 |

(Continued)

*Primary Examiner* — Ryan Barrett
*Assistant Examiner* — Haimei Jiang
(74) *Attorney, Agent, or Firm* — Mathieu Audet

(57) ABSTRACT

A computer-readable medium including computer-executable instructions providing a method of displaying arrays of computer-readable files, the method comprising causing a first array of computer-readable files to be displayed, said first array of computer-readable files being displayed along a timeline according to a first timescale; causing a second array of computer-readable files to be displayed, said second array of computer-readable files being displayed along a timeline according to a second timescale. An interface, a computerized system and a method for providing same is also disclosed therein.

20 Claims, 13 Drawing Sheets

Related U.S. Application Data continuation of application No. 14/930,744, filed on Nov. 3, 2015, now Pat. No. 10,430,495, which is a continuation of application No. 13/798,969, filed on Mar. 13, 2013, now abandoned, which is a continuation of application No. 12/125,908, filed on May 22, 2008, now Pat. No. 8,601,392.

(60) Provisional application No. 61/034,625, filed on Mar. 7, 2008, provisional application No. 60/971,214, filed on Sep. 10, 2007, provisional application No. 60/957,444, filed on Aug. 22, 2007.

(51) Int. Cl.
  *G06F 3/04817* (2022.01)
  *G06F 3/04842* (2022.01)

(56) References Cited

U.S. PATENT DOCUMENTS

| | | | | |
|---|---|---|---|---|
| 7,372,473 | B2* | 5/2008 | Venolia | G06F 3/0481 345/661 |
| 7,770,117 | B1* | 8/2010 | Uy | G11B 27/34 715/726 |
| 8,166,415 | B2* | 4/2012 | Cisler | G06F 3/0481 715/778 |
| 8,601,392 | B2* | 12/2013 | Audet | G06F 40/103 715/810 |
| 2005/0289482 | A1* | 12/2005 | Anthony | G06F 16/168 715/851 |
| 2006/0156246 | A1* | 7/2006 | Williams | G06F 16/58 715/764 |
| 2007/0288247 | A1* | 12/2007 | Mackay | G06F 16/113 705/1.1 |
| 2008/0022199 | A1* | 1/2008 | Sako | G06F 16/54 715/273 |
| 2020/0311335 | A1* | 10/2020 | Audet | G06F 40/103 |

\* cited by examiner

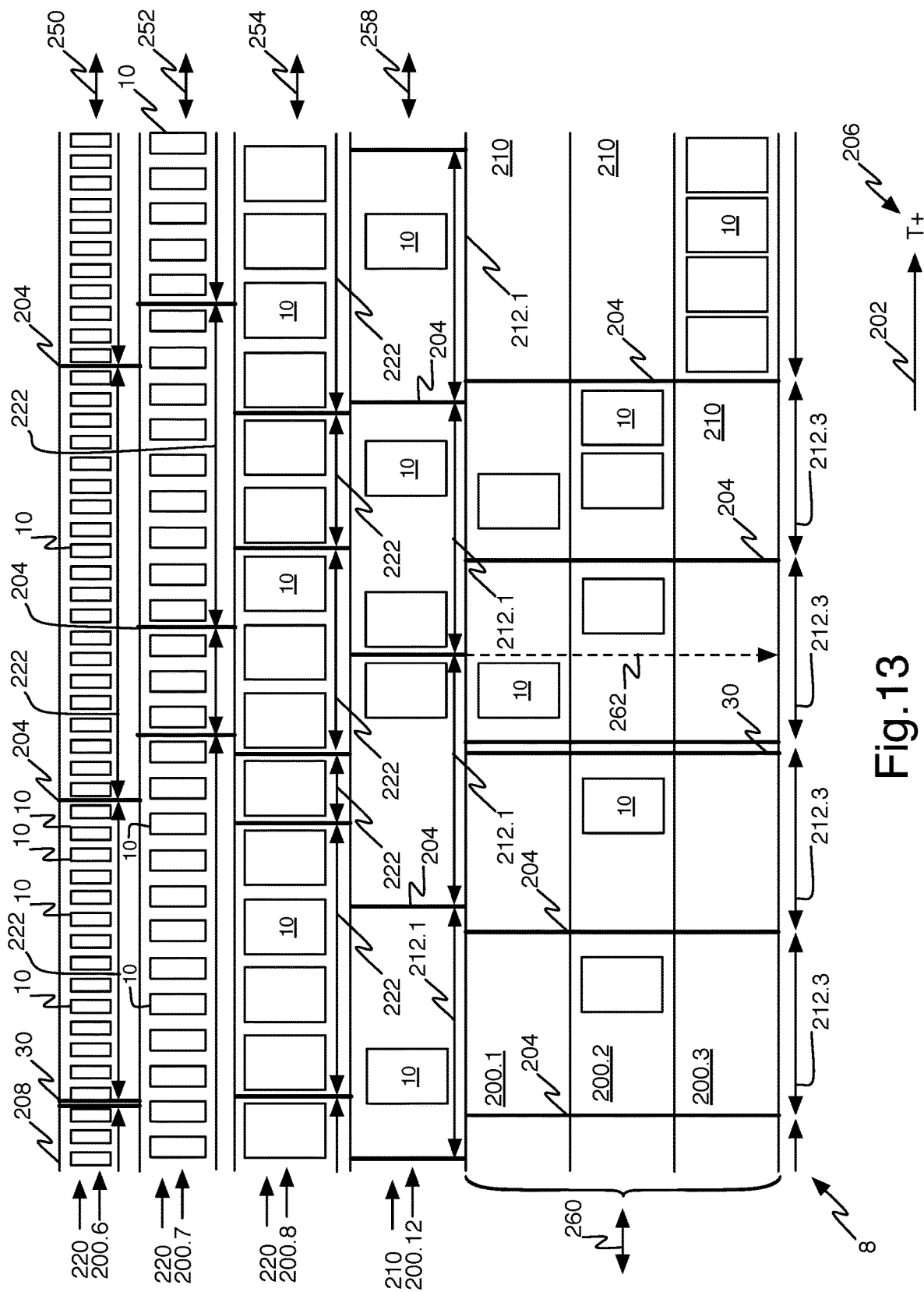

AXIS OF USER-SELECTABLE ELEMENTS WITH LINEAR TIMESCALE AND NON-LINEAR TIMESCALE

CROSS-REFERENCES

The present invention relates to 1) U.S. patent application Ser. No. 11/754,219, filed May 25, 2007, entitled MULTI-DIMENSIONAL LOCATING SYSTEM AND METHOD, now U.S. Pat. No. 8,826,123; 2) U.S. patent application Ser. No. 11/885,120, filed Sep. 13, 2007, entitled INFORMATION ELEMENTS LOCATING SYSTEM AND METHOD, now U.S. Pat. No. 8,069,404; 3) U.S. patent application Ser. No. 11/944,014, filed Nov. 21, 2007, entitled METHOD AND TOOL FOR CLASSIFYING DOCUMENTS TO ALLOW A MULTI-DIMENSIONAL GRAPHICAL REPRESENTATION, now U.S. Pat. No. 8,788,937; and 4) U.S. patent application Ser. No. 11/774,591, filed Jul. 7, 2007, entitled INFORMATION ELEMENTS LOCATING SYSTEM AND METHOD, now U.S. Pat. No. 8,010,508; all of these cited documents being incorporated herein by reference. The present invention also relates to 5) United States Patent Application Publication No. US 2007/0214169 A1, published Sep. 13, 2007, entitled MULTI-DIMENSIONAL LOCATING SYSTEM AND METHOD; and 6) United States Patent Application No. US 2007/0271508 A1, published Nov. 22, 2007, entitled MULTI-DIMENSIONAL LOCATING SYSTEM AND METHOD. Both of these documents are incorporated herein by reference. Additionally, this application is a continuation of and claims priority under 35 U.S.C. § 120 to U.S. patent application Ser. No. 16/543,566, filed Aug. 18, 2019, which '566 Application is a continuation of and claims priority under § 120 to U.S. patent application Ser. No. 14/930,744, filed Nov. 3, 2015, now U.S. Pat. No. 10,430,495, which '744 Application is a continuation of and claims priority under § 120 to U.S. patent application Ser. No. 13/798,969, filed Mar. 13, 2013, which '969 Application is a continuation of and claims priority under § 120 to U.S. patent application Ser. No. 12/125,908, filed May 22, 2008, now U.S. Pat. No. 8,601,392, which '908 Application claims priority under 35 U.S.C. § 119(e) to each of: U.S. Provisional Patent Application No. 60/957,444, filed Aug. 22, 2007; U.S. Provisional Patent Application No. 60/971,214, filed Sep. 10, 2007; and U.S. Provisional Patent Application No. 61/034,625, filed Mar. 7, 2008. All of these cited documents are incorporated herein by reference.

BACKGROUND OF THE INVENTION

1. Field of the Invention

This invention relates generally to computer systems and more specifically to user interfaces for computer systems that facilitates localization and organization of documents along timelines.

2. Description of the Related Art

United States Patent Application Publication No.: US 2007/0214169 A1, published on Sep. 13, 2007 discloses a Multi-dimensional locating system and method (title). The patent application discloses ways for managing and displaying vectors of documents and other computer-readable files. A vector of documents groups a plurality of documents along a predetermined order, inter alia, is taught.

United States Patent Application Publication No.: US 2007/0271508 A1, published on Nov. 22, 2007 discloses a Multi-dimensional locating system and method (title). A plurality of vectors of documents sharing a common timeline is disclosed.

Under some circumstances it is useful to display documents along a timeline although it can prevent an efficient use of the display area when, for example, no documents are located on the timeline over a significant period of time.

More than one vector of documents are displayable wherein each vector of documents can group documents having a specific attribute in common. Thus the number of documents chronologically disposed on each vector of documents can vary and a timescale commonly shared by the vectors of documents does not maximize the use of the display area.

Using the same timescale for a plurality of vectors of documents with a different number of documents on each vector for the same period of time does not allow an efficient simultaneous display of the vectors of documents. If the timescale is based on a vector of documents having many documents, another vector of documents that has very little documents will almost be empty. Conversely, if the timescale is based on the vector of documents having very little documents, the other vector will be so crowded with documents that it will hardly be possible to usefully glance through the documents. The documents being not enough evenly distributed on both vectors of documents it becomes difficult to appreciate documents displayed on different vectors of documents at the same time with the same timescale.

Another issue arise when one vector of documents is more insightfully displaying its documents according to a linear timeline to show, for example, the distribution of the documents on the vector and another vector of documents displays that documents according to a non-linear timeline (i.e. because there is no added value to show the distribution of the documents along the timeline). A common timeline can therefore hardly be used for both arrays of documents.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

It is one aspect of the present invention to provide more than one timeline along which arrays of documents/computer-readable files/multimedia assets are displayed.

Another aspect of the present invention provides an interface adapted to display arrays of documents chronologically displaying documents along timelines using different timescales.

One other aspect of the present invention provides an interface adapted to display documents along a timeline using a linear timescale, where the documents are not evenly displayed along the timeline representing time in a linear fashion, and documents along a timeline using a non-linear timescale, presenting documents with a substantially constant interval therebetween.

One other aspect of the invention provides a combined view where a plurality of arrays of documents displaying documents along a timeline using a linear timescale are displayed with a plurality of arrays of documents displaying documents along a timeline using a non-linear timescale.

Another aspect of the invention provides separate display areas (or time space) respectively displaying arrays of documents about distinct timelines in each display area. The timelines can use a non-linear or a linear timescale.

An aspect of the present invention provides a plurality of arrays of documents displayed along their respective timelines and adapted to move independently along their respective timeline.

One other aspect of the present invention provides a display with multiple time-spaces, each time-space displaying a timeline with its own timescale.

One aspect of the present invention provides a display with multiple time-spaces, each time-space displaying a timeline using either a linear timescale or a non-linear timescale.

Another aspect of the present invention provides a function to change the timescale of an array of documents between a linear timescale and a non-linear timescale.

An aspect of the present invention provides a first time-space on a first display and a second time-space on a second display.

One aspect of the present invention provides time marks that are shared between a plurality of arrays of documents using a compatible timescale.

Another aspect of the present invention provides a computerized system adapted to read computer executable instructions adapted to enable a program element enabling an interface adapted to display arrays of documents, the computerized system comprising a processing unit adapted to process the computer executable instructions, a display adapted to display the interface; and the program element, when executed, being operative for causing an array of computer-readable files to be displayed, the array of computer readable files being displayed along a timeline according to a first timescale; and causing an array of computer readable files to be displayed, the array of computer readable files being displayed along a timeline according to a second timescale.

One other aspect of the present invention provides a computer interface comprising a first array of documents to be displayed, said first array of documents being displayed along a timeline according to a first timescale; a second array of documents to be displayed, said second array of documents being displayed along a timeline according to a second timescale.

An aspect of the present invention provides a computer-readable medium including computer-executable instructions providing a method of displaying arrays of computer-readable files, the method comprising causing a first array of computer-readable files to be displayed, said first array of computer-readable files being displayed along a timeline according to a first timescale; causing a second array of computer-readable files to be displayed, said second array of computer-readable files being displayed along a timeline according to a second timescale.

These and other advantages and features of the present invention will become apparent from the following description and the attached drawings.

BRIEF DESCRIPTION OF THE DRAWINGS

FIG. 13 is a schematic view of a plurality of arrays of documents along either a non-linear timeline or a linear timeline.

DESCRIPTION OF EMBODIMENT(S) OF THE INVENTION

Figure 1:
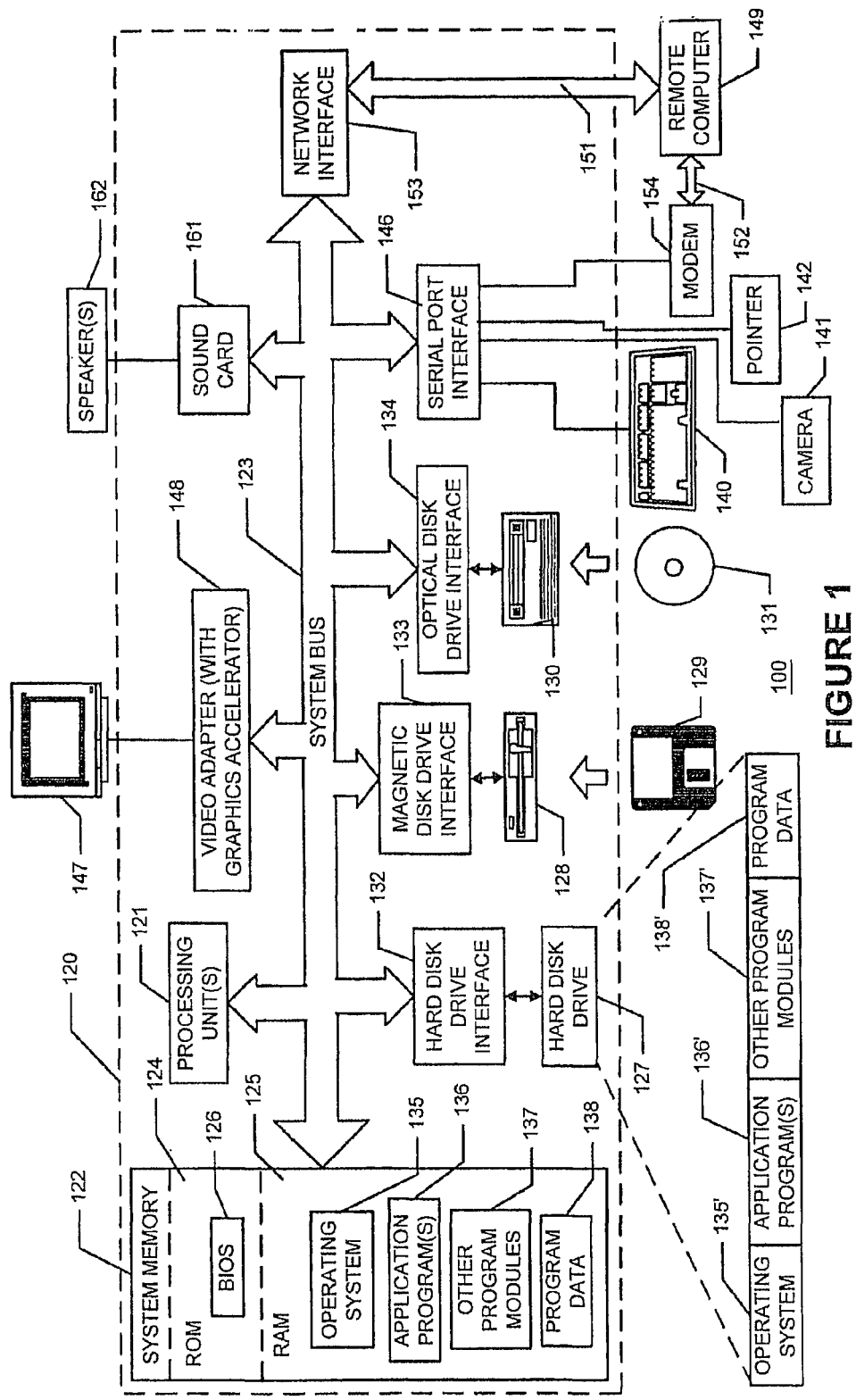
FIG. 1 is a schematic view of a computer system.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The features provided in this specification mainly relates to computer software and machine-readable code/instructions. This code/instructions are preferably stored on a machine-readable medium to be read and acted upon to with a computer or a machine having the appropriate code/instructions reading capability.

FIG. 1 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be affected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, portable phones and the like. At least some aspects of the present invention may also be practiced in distributed computing environments where tasks are performed by remote processing devices linked through a communications network (i.e. client-server, internet based application, . . . ). In a distributed computing environment, program modules may be located in local and/or remote memory storage devices.

With reference to FIG. 1, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, or the like may also be included. These and other input devices are often connected to the processing unit 121 through a serial port interface 146 coupled to the system bus. However, input devices may be connected by other interfaces, such as a parallel port, a game port or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 1 include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152 (e.g. Wi-Fi, WinMax). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

Figure 2:
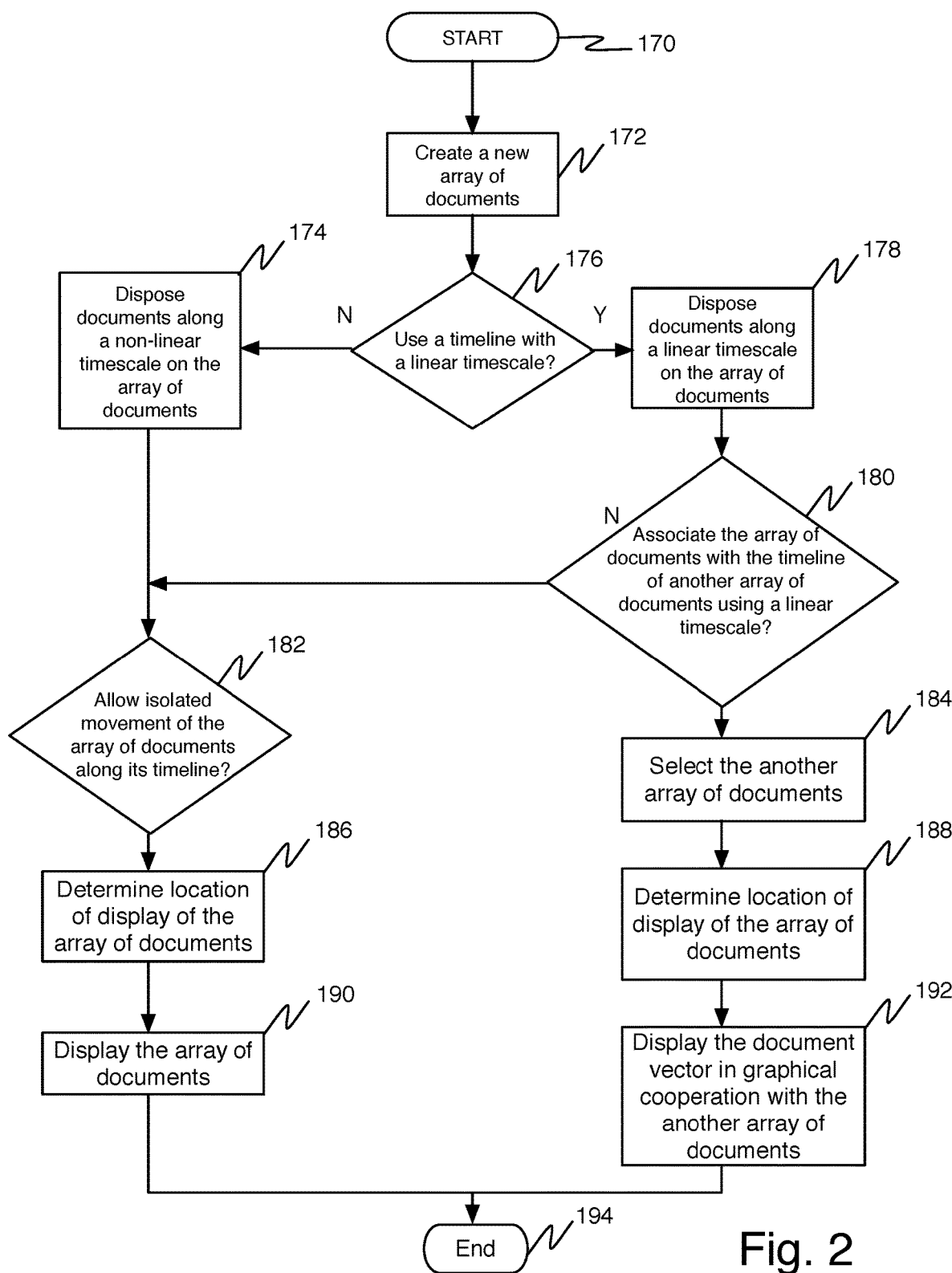
FIG. 2 is a flow chart of one exemplary process that can be used to create a new array of documents.

FIG. 2 is a flow chart of one exemplary way to create an array of documents (or an array of computer-readable files or an array of multimedia assets). A user of the computer interface desires to create a new array of documents 172. The user decides what timescale will use the timeline of the new array of documents 176. If a linear timescale is selected the documents will be disposed on the new array of documents along a timeline using a linear timescale 178. Conversely, if a non-linear timescale is selected the documents will be disposed on the new array of documents along a timeline using a non-linear timescale 174. Continuing with the new array of documents using a non-linear timescale 174 the user can decide whether isolated movement of the new array of documents along its timeline will be allowed 182. The location of the new array of documents on the display is then selected 186 and the new array of documents is displayed on the display 190.

Returning back to the new array of documents using the linear timescale 178. Once the type of timescale is decided the user decides if s/he wants to associate the linear timescale of the new array of documents with an already existing array of documents using a linear timescale 180. If no association with another array of documents is made then the process follows the route explained above at box 182. In contrast, if the linear timescale of the new array of documents is associated with another array of documents, the another array of documents is then selected among other arrays of documents 184. The array of documents to be selected can already be associated with a number of other arrays of documents thus all sharing the same linear timescale. Once the other array of documents is selected then the location of the display of the new array of document is decided 188. It can be made by a simple selection on the display but preferably next to the array of documents with which the timescale is shared so that the time marks can be commonly shared. The new array of documents is then displayed 192. This ends 194 one exemplary way to create a new array of documents taking into consideration the type of timescale to be used in addition to several other related decisions.

Now that a general process has been explained we will move to a more detailed explanation of its constituting parts.

In the context of the present invention the following terms are generally used with their associated meaning.

Document: A piece of information. Generally a computer file usually created with an application (such as a word processor) carrying textual, audio, video or graphical information.

Timeline: A chronological order adapted to position documents according to a time-related parameter.

Timescale: The time distribution along the timeline.

Linear timescale: Substantially constant time distribution.

Non-linear timescale: Substantially variable time distribution.

Array: A regular and imposing grouping or arrangement of documents/files/assets. Generally an array of documents will dispose documents along a substantially rectilinear fashion although other dispositions (such as inter alia multiple rectilinear superposition, matrixes, flow charts like disposition, tri-dimensional distribution) are encompassed by the present definition.

Combined view: Display of arrays of documents having different timescales.

Display: Means for displaying a graphical representation of an array of documents. Commonly referred to, inter alia, a computer screen, a television, a projector, a touch sensitive screen and a means to provide tri-dimensional graphical rendering.

Time-space: Means for displaying arrays of documents using a similar timescale. The time-space can accommodate a single array of document.

Figure 3:
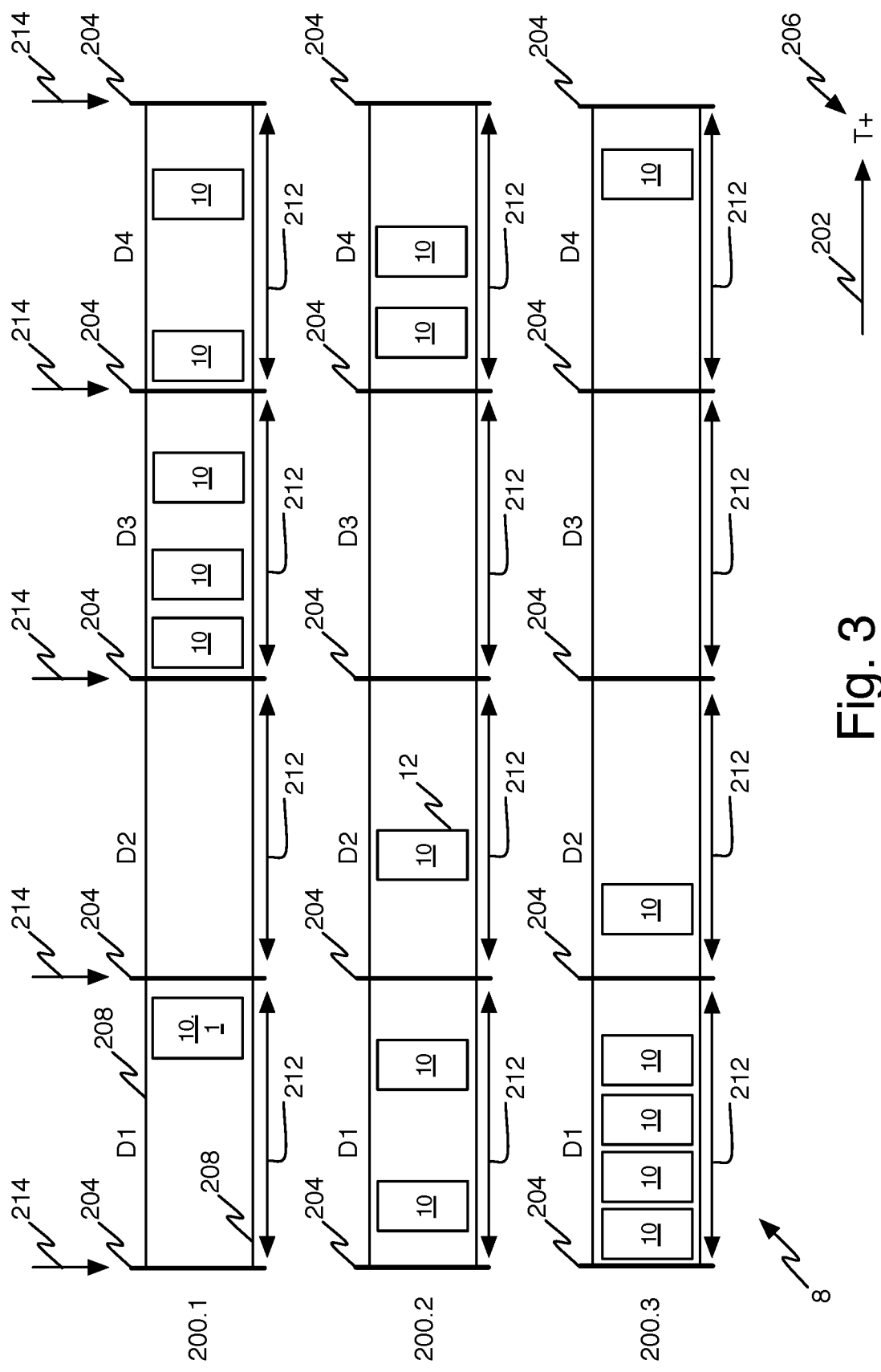
FIG. 3 is a schematic view of an illustrative display portion of a graphical user interface displaying a plurality of arrays of documents along a linear timeline.

Embodiment One—Linear Timescale with Aligned Time Marks Between Arrays of Documents Having Units of Time of Similar Duration FIG. 3 illustrates three arrays of documents 200.1, 200.2, 200.3 disposed next to one another on a computer interface 8. Each array of documents 200.1, 200.2, 200.3 has a vector-like shape and is bordered with guides 208 to visually emphasis the width and the direction of the each array of documents 200.1, 200.2, 200.3. Each array of documents 200.1, 200.2, 200.3 displays a series of documents 10 disposed along a timeline 202. Each array of documents 200.1, 200.2, 200.3 can group and display a plurality of documents 10 having a commonality. A commonality like an attribute associated with each document or a tag in common so that only a subset of a larger group of documents 10 is displayed. In the present situation the timeline is a chronological timeline where positive time 206 is heading to the right of FIG. 3. Each document 10 is disposed along the timeline 202 on its array of documents 200.1, 200.2, 200.3 in accordance with a time-related criteria that can be, inter alia, the time of insertion of the document 10 in the computer system running the interface, the time at which a document was modified last, the time of creation of the document, the last viewed time, the end of a delay, a bar date, the date by which a document should be received in reaction to an action made earlier in time or simply an arbitrary time associated with each document. The user can decide, for instance, that all documents 10 will be displayed along their related timelines using the time of insertion of the documents in the computer system. This way all documents will be disposed on a timeline at the exact time they were inserted in the computer system. For simplification each document can appear during the day of its insertion in the system and not precisely at the exact hour.

Still on FIG. 3, each array of documents 200.1, 200.2, 200.3 is separated in unit of time. In this case the units of time are days D1, D2, D3, D4. Each unit of time D1, D2, D3, D4 is separated with a time mark 204. For example, day 1 (D1), day 2 (D2), day 3 (D3), day 4 (D4) and day 5 (D5) all have the same length 212 and are each respectively separated by a time mark 204. In this case, the illustrative example is using a "day" as time unit but it could be minutes, hours, weeks, months, years, fiscal year, a project milestones or any other custom duration of time. Each unit of time D1, D2, D3, D4 on FIG. 3 is represented with a constant time length 212. The first document 10.1 on the array of documents 200.1 was, for example, inserted in the computer system on the second half of the day represented by unit of time D1. No document was inserted on D2 and so on so forth.

The timescale of all arrays of documents depicted on FIG. 3 is a linear timescale. This means that the duration of each unit of time D1, D2, D3, D4 is represented having the same length 212. The constant time length 212 provides the possibility of aligning 214 each time mark 204 to unify the timescale of all arrays of documents 200.1, 200.2, 200.3, 200.4.

Still referring to FIG. 3, the distance between each array of documents 200.1, 200.2, 200.3 can be the same of it can vary depending on what is desired by the user of the computer interface 8. Each document 10 is represented with a rectangle 12 but other shapes are encompassed by the present invention. The rectangular shape 12 is used because it infers more easily with a sheet of paper in the present illustrative example. Each document 10 is either displaying the document itself, a thumbnail of the document or an icon depending on the purpose of the view, the level of the zoom and/or the desired amount of details to be shown. A picture taken in landscape would have a different shape and the present invention does not intend to be limited to the illustrative shapes displayed in the Figures.

In the following Figures all documents 10, time marks 204 and time length 212 might not be individually associated with a related reference number to avoid unusefully overloading the Figures. The Applicant assumes that people skilled in the art of computer interface will not be confused with the omitted reference numbers on the Figures when considered in light of the description and will be resourceful enough to refer to a Figure where the reference number is indicated or relevant passage from the description in case of need.

Turning back now to FIG. 4 illustrating the same three arrays of documents 200.1, 200.2, 200.3 from FIG. 3. Two additional arrays of documents 200.4, 200.5 have been added non-parallel to the three first arrays of documents 200.1, 200.2, 200.3. Array 200.4 is logically intersecting array 200.2, based on intersecting document 20. Array 200.4 also shows time marks 204 and constant time lengths 212. Similarly, intersecting array 200.5 is logically intersecting array 200.1, based on intersecting document 20. Array 200.5 also shows time marks 204 and variable time lengths 222 that will be discussed below. The role of intersecting arrays 200.4, 200.5 is explained in details in a previous patent application referenced by the instant patent application and will not be discussed here in details.

Figure 4:
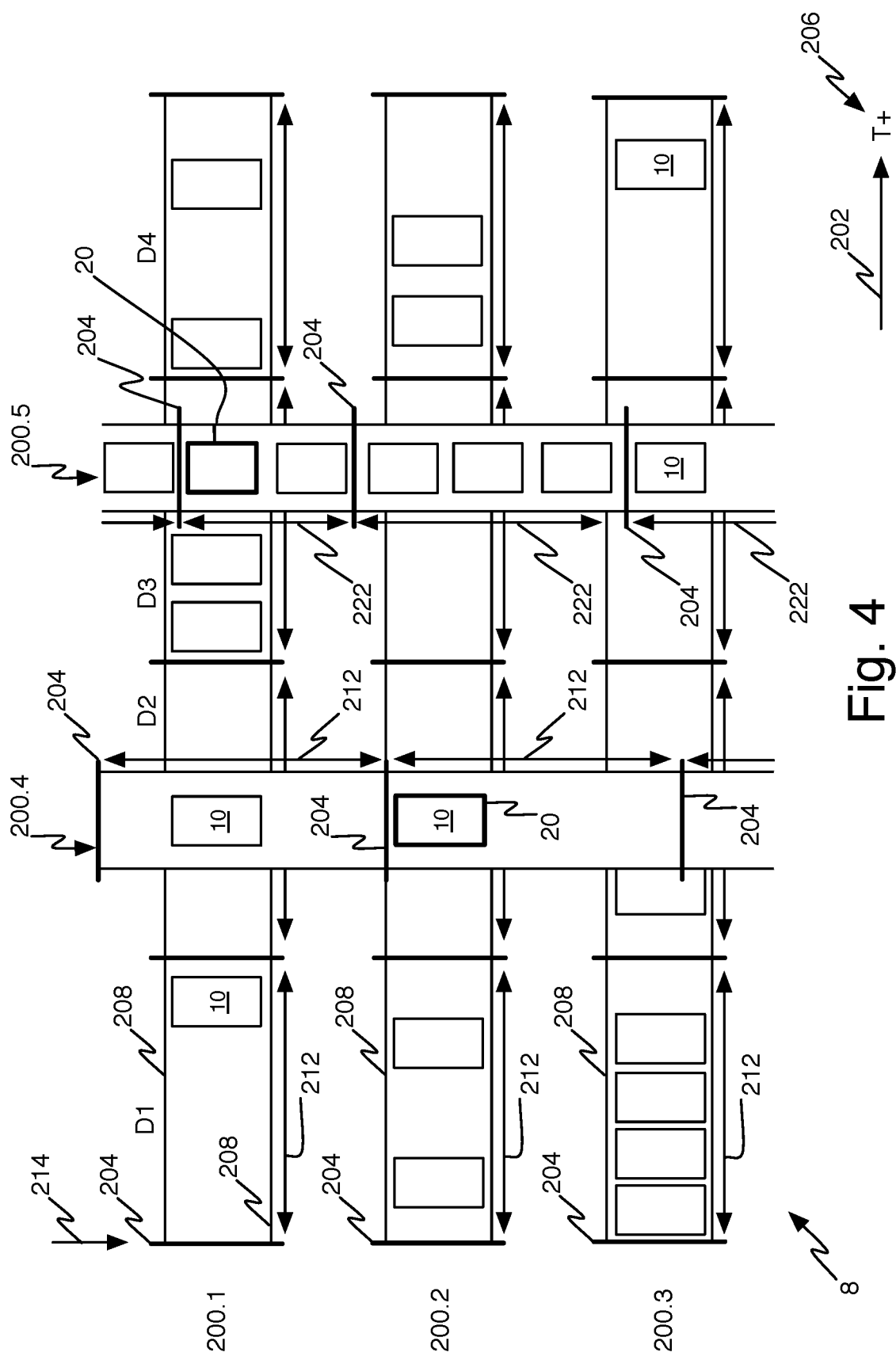
FIG. 4 is the schematic view of FIG. 3 with additional intersecting arrays of documents.

The array of documents 200.1 illustrated on FIG. 3 and FIG. 4 has a unit of time D2 containing no documents. Depending on the situation it might be helpful to see the distribution of the documents 10 depicted along the timeline 202 of array 200.1 with the empty units of time. However, it is also a loss of space on the display if the distribution of the documents 10 on the array and the showing of a unit of time D2 showing no documents 10 are not insightful. Removal of specific units of time or empty units of time can be desirable. For example, a unit of time D4 might not contain documents 10 that are desirable to see and this unit of time D4 might be removed from the display. The removal of units of time can be made manually by a user of automatically if, for instance, there is no documents in a time unit or if only documents having a specified attribute are present.

Figure 5:
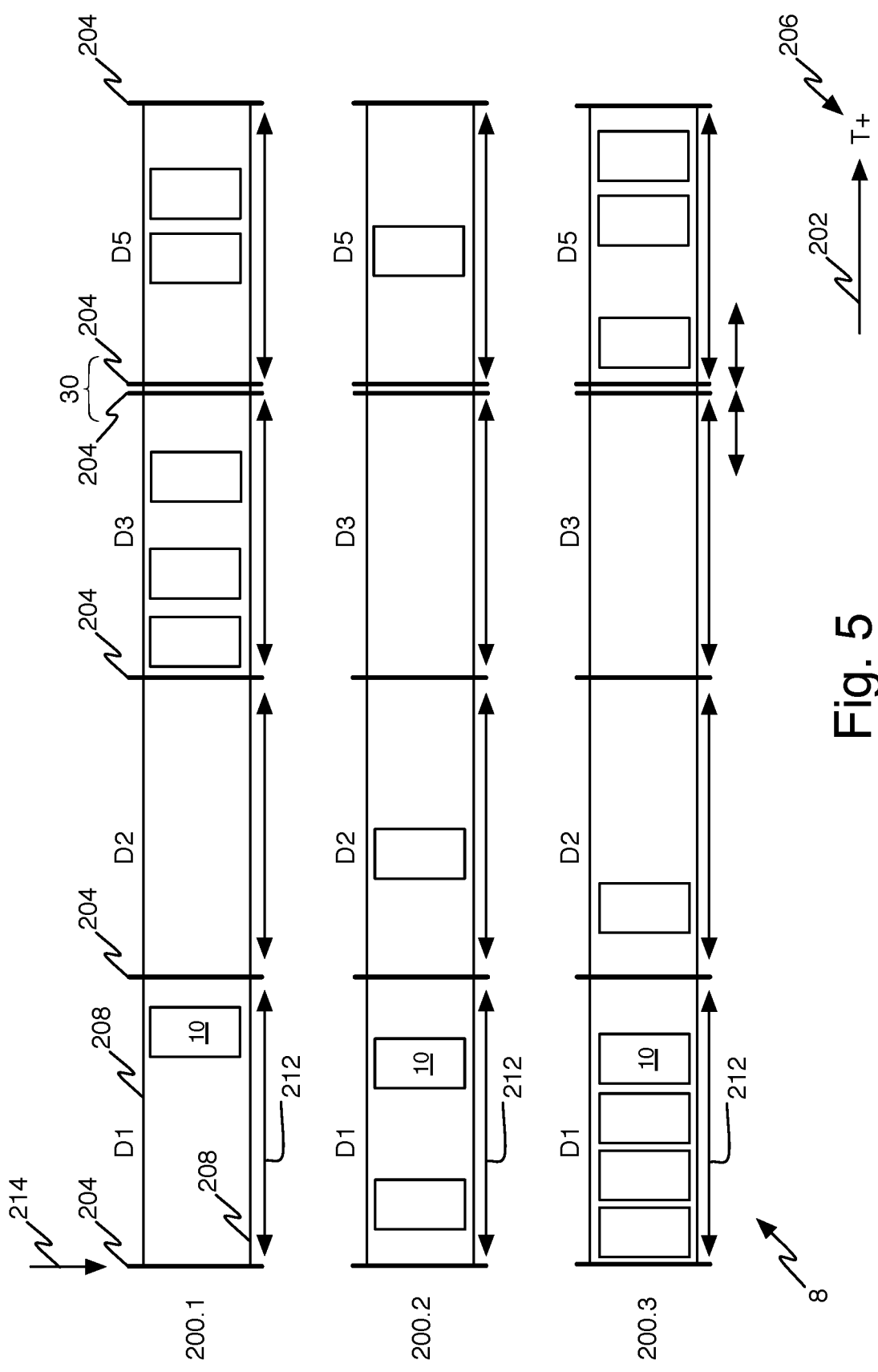
FIG. 5 is the schematic view of FIG. 3 with invisible units of time.

An alternate view of FIG. 3 hiding unit of time D4 is illustrated on FIG. 5. The unit of time D4 is hidden and the time marks 204 juxtaposed to the unit of time D4 have been moved close one to each other to form a distinctive visual time mark 30 that is called invisible unit of time time mark 30. The selection of invisible unit of time mark 30 by the user of the interface can provide information about the invisible time period and the possibility of display it if desired. A selection of one or many unit(s) of time D can offer the possibility to render invisible this portion of the timeline.

Figure 6:
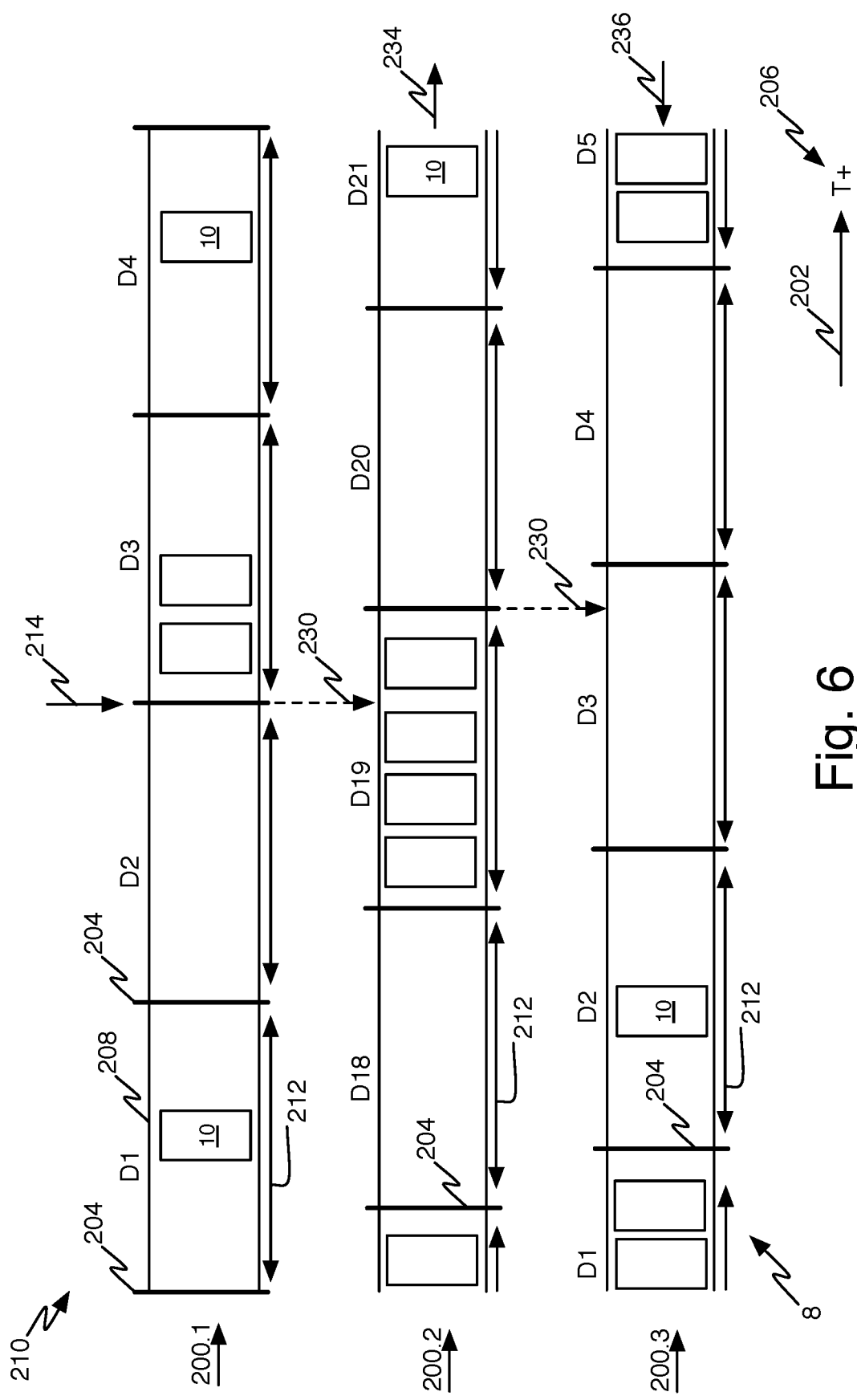
FIG. 6 is the schematic view of FIG. 3 with non-aligned time marks.

Embodiment Two—Linear Timescale with Non-Aligned Time Marks Between Arrays of Documents Having Units of Time of Similar Duration FIG. 6 illustrates the three arrays of documents 200.1, 200.2, 200.3 of FIG. 3 with the difference that the time marks 204 are not aligned anymore as indicated by dotted arrow 230. Despite the three arrays of documents 200.1, 200.2, 200.3 sharing a similar linear timescale they cannot share the same timemarks 204.

Array of document 200.2 has been individually translated in the positive 206 direction of the timeline 202 as indicated by arrow 234 while the first array of documents 200.1 remained in the same position. The third array of documents 200.3 has slightly been individually translated in the negative direction of the timeline 202 as indicated by arrow 236.

The translation along the timeline of an array of documents 200.2, 200.3 allows a user to visualize a different unit of time on the array of documents. For example, array of documents 200.1 displays units of time D1, D2, D3, D4 while units of time D18, D19, D20, D21 are displayed for the second array of documents 200.2. The third array of documents 200.3 is still displaying the same units of time D1, D2, D3, D4 as the first array of documents 200.1 although a slight translation has began and unit of time D5 is now partially visible anymore.

The translation of an array of document can be made with an appropriate control in communication with the computer system to manage the arrays of documents on the interface. For instance, the arrow keys on the keyboard, a mouse, a pointing device, fingers on a tactile screen, a gamepad or any other means to influence the position of the arrays on the display is encompassed by the present invention. In the present example a point-click-hold-and-move set of actions with a pointing device has positioned the arrays of documents.

Figure 7:
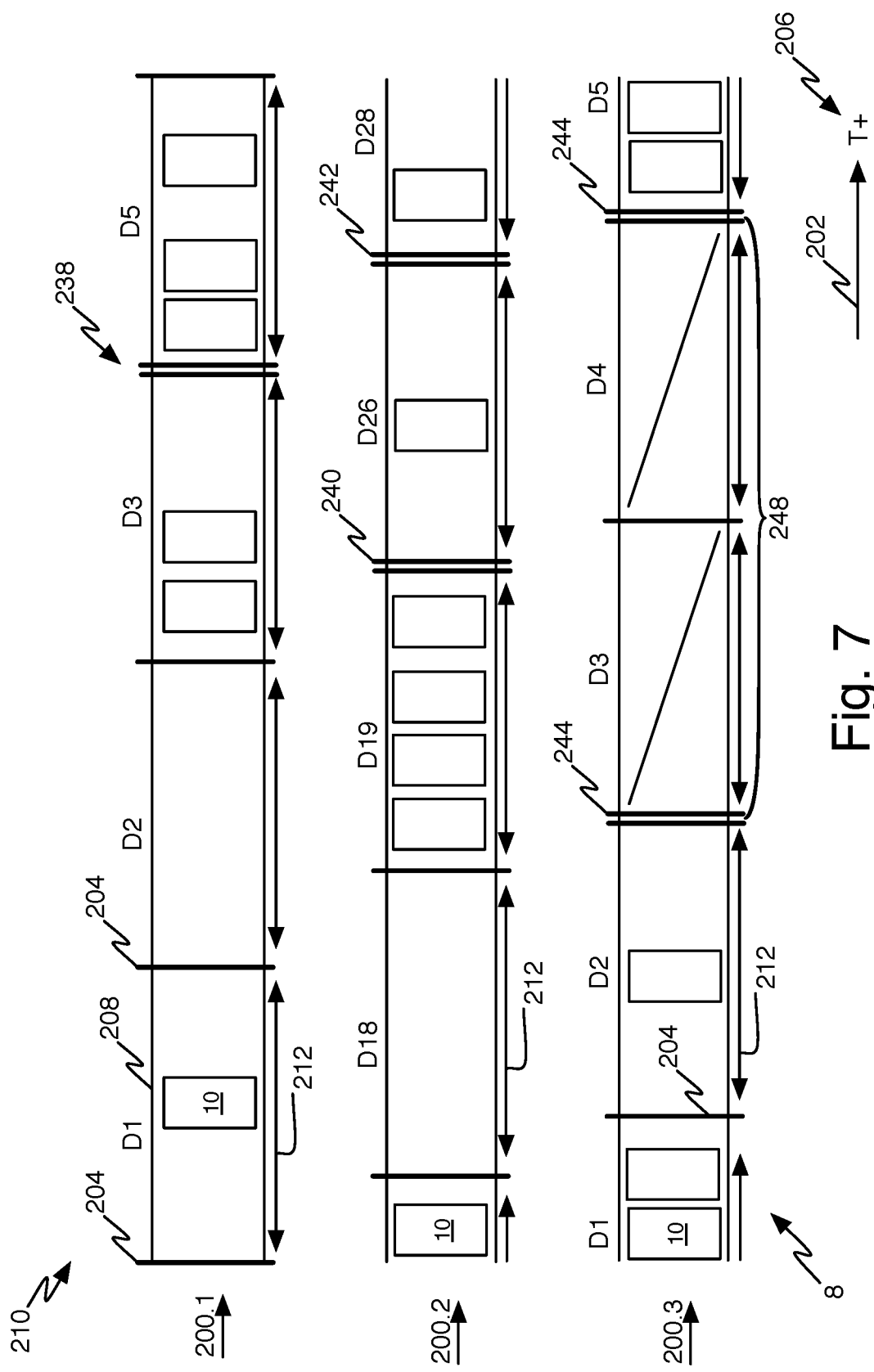
FIG. 7 is the schematic view of FIG. 3 with non-aligned time marks and invisible units of time.

Referring to FIG. 7 one can appreciate that, as indicated by arrow 238, unit of time D4 from array of documents 200.1 has been hidden in favor of adjacent units of time D3, D5 containing documents. Several units of time (e.g. D20 to D25 and D27) have been hidden from array of documents 200.2 as indicated by invisible unit of time timemarks 240, 242. On array of documents 200.3, units of time D3, D4 are in the process of being hidden to benefit units of time D2, D5. Invisible unit of time timemarks 244, 246 are already displayed on array of documents 200.3 and a length 248 will not be visible anymore until the interface is instructed to render this length 248 visible again. Units of time including documents can be hidden if required by the user based on some criterions like a selected attribute.

Embodiment Three—Linear Timescale with Non-Aligned Time Marks Between Arrays of Documents Having Units of Time of Dissimilar Durations FIG. 7 illustrates three arrays of documents 200.1, 200.2, 200.3 having a linear timescale. The linear timescale of each array of documents is however different as opposed to the previous illustrative example depicted on FIG. 6. On FIG. 8, the first array 200.1 uses unit of time 212.1 having a duration of time that is longer than the duration of the unit of time 212.2 of array 200.3. The duration of the unit of time 212.3 of array 200.3 is longer than the duration of time of unit of time 212.2 but shorter than the duration of unit of time 212.1. A different number of unit of time 212 can be shown on the same display width.

Since arrays 200.1, 200.2, 200.3 are not using the same duration of unit of time they cannot share the same time marks 204. The duration of the unit of time of each array of documents can be selected individually to provide the view that is the most suited for the user. If for instance array 200.1 is displaying documents 10 that are more important than the documents displayed by array 200.2, then, the duration of the unit of time 212.1 can be set to be longer than the duration of the unit of time 212.2. Because the durations of time of each array of documents is distinct the time marks cannot be used collectively.

Figure 8:
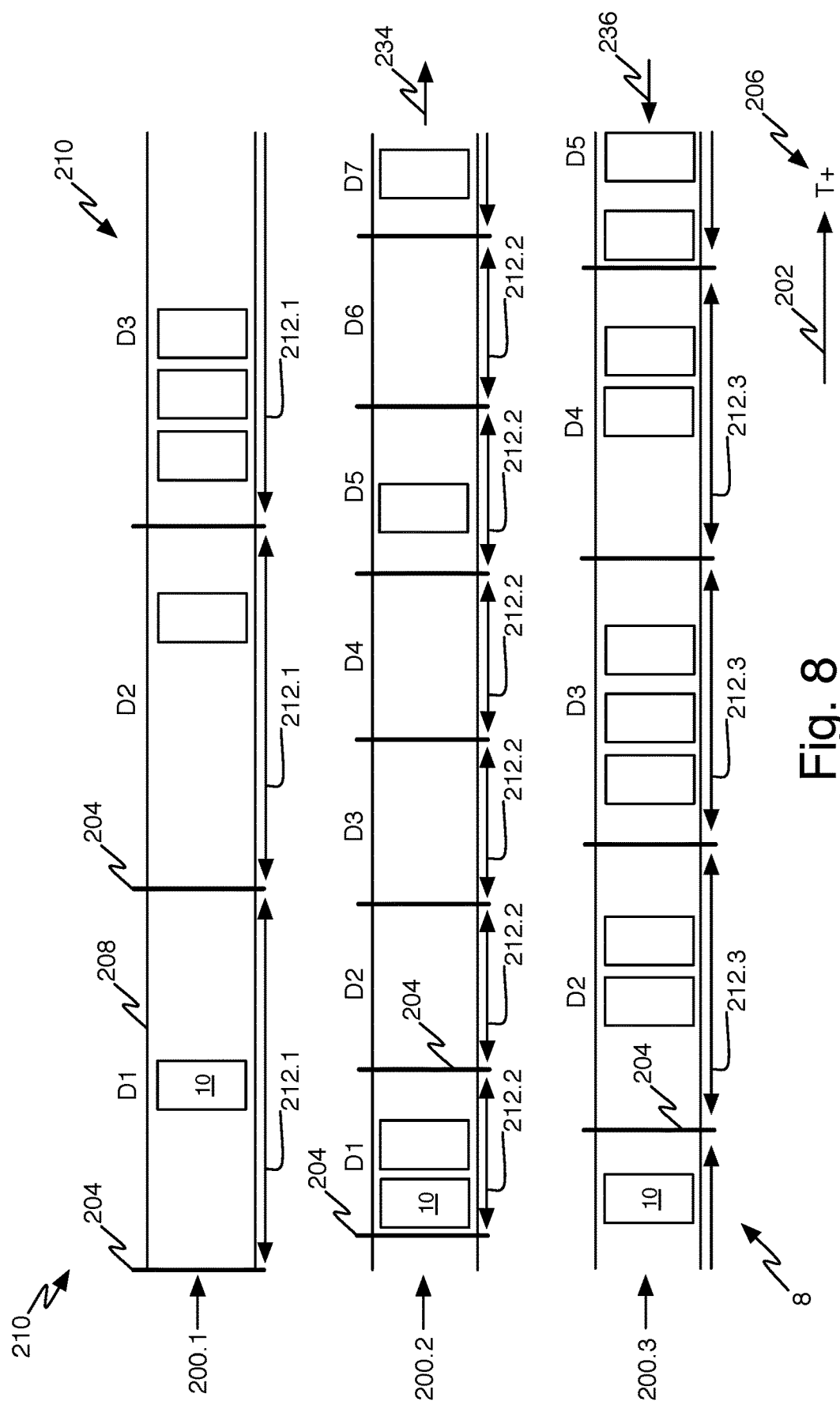
FIG. 8 is a schematic view of an illustrative graphical user interface displaying a plurality of arrays of documents along a non-linear timeline.
Figure 9:
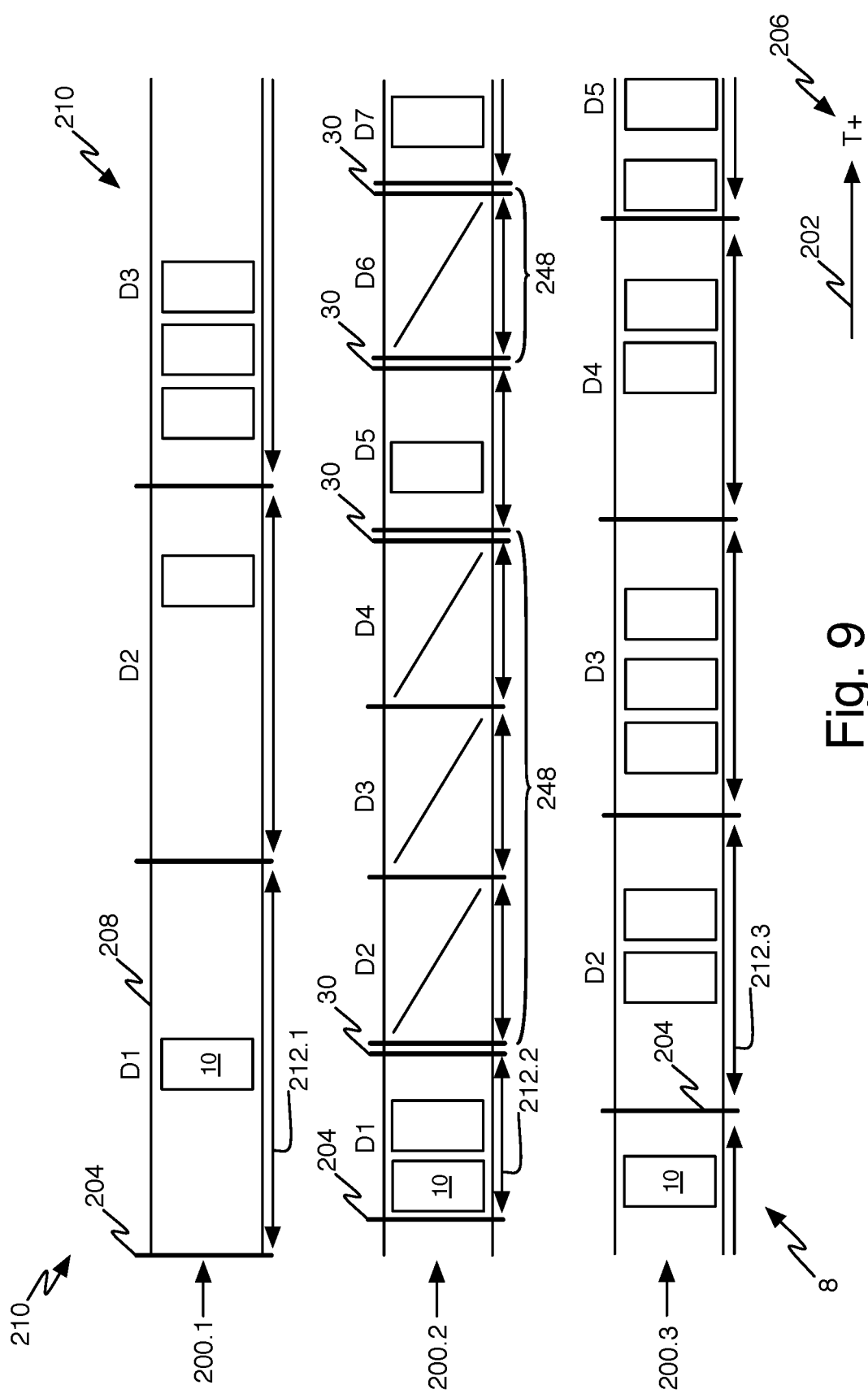
FIG. 9 is the schematic view of FIG. 8 with units of time about to become invisible.

Referring now to FIG. 9 one can appreciate the same arrays of documents as the ones displayed on FIG. 8 although lengths of time 248 from array 200.2 are about to be rendered invisible. The principle has been explained before and it will not be re-explained here. The same mechanism is simply applied in this embodiment.

Embodiment Four—Arrays of Documents Using Non-Linear Timescales

Figure 10:
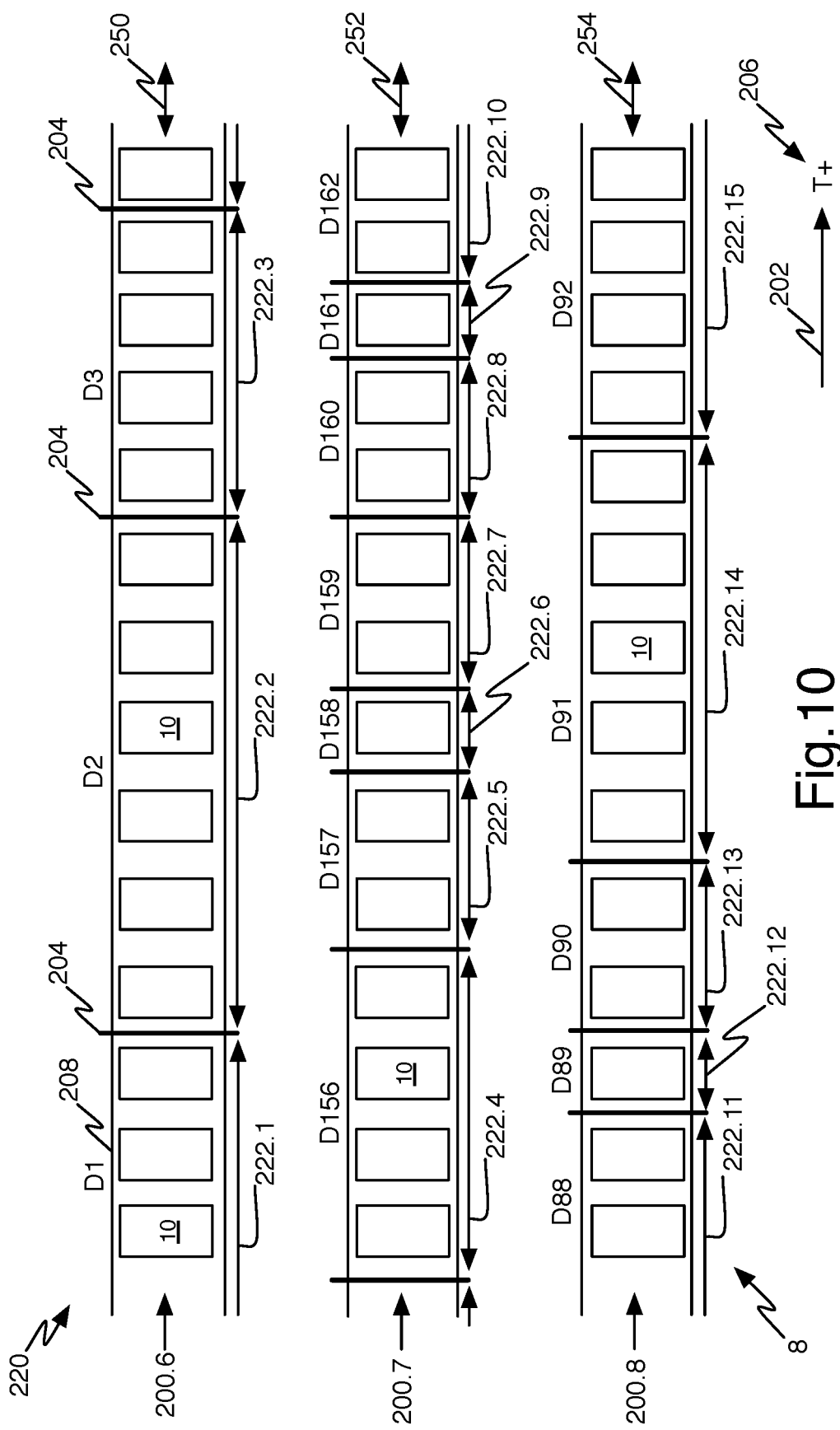
FIG. 10 is a schematic view of an illustrative graphical user interface displaying a plurality of arrays of documents along a non-linear timeline.

Turning now to FIG. 10 displaying three new arrays of documents 200.6, 200.7, 200.8. Each of these arrays of documents 200.6, 200.7, 200.8 are displaying documents 10 along their respective timelines 202 using a non-linear timescale. The non-linear time line is giving up the linearity of time in favor of an even documents distribution using more efficiently the space available on the array of documents. The use of a non-linear timescale disposes each document 10 at a substantially constant interval. For instance, array of documents 200.6 display a portion of its first time unit D1 having a length 222.1 corresponding to the length needed to display all documents 10 that need to be displayed in time unit D1. The second time unit D2 on array of documents 200.6 displays six documents 10 along the timeline 202 and the length 222.2 is the length needed to evenly distribute and display the six documents 10. The same for the third time unit D3 with its four documents. Each time unit D1, D2, D3 is separated with a time mark 204 from the other adjacent time unit.

Still on FIG. 10, array of documents 200.7 displays time units D156, D157, D158, D159, D160, D161, D162. Each time unit D156-D162 contains a number of documents 10 and the length of each time unit 222.4, 222.5, 222.6, 222.7, 222.8, 222.9, 222.10 is proportional to the length needed to equally distribute the number of documents belonging to each unit of time. The same logic applies to array of documents 200.8 with units of time D88-D92 and timeline lengths 222.11-222.15.

Each array of documents 200.6, 200.7, 200.8 can be displaced along the timeline 202 like it is respectively indicated by arrows 250, 252, 254. This explains why different time periods are visible on each array despite they appear one over the other. The time marks 204 are not aligned across the three arrays of documents because the length of each time unit D* is not standardized (e.g. non-linear timescale) in contrast to the standardized length of units of time used by a linear timescale as previously described.

The non-linear timescale 220 does save space on the display because there are no empty spaces left out as opposed to the use of a linear timescale 210 always using the same length for each unit of time.

Figure 11:
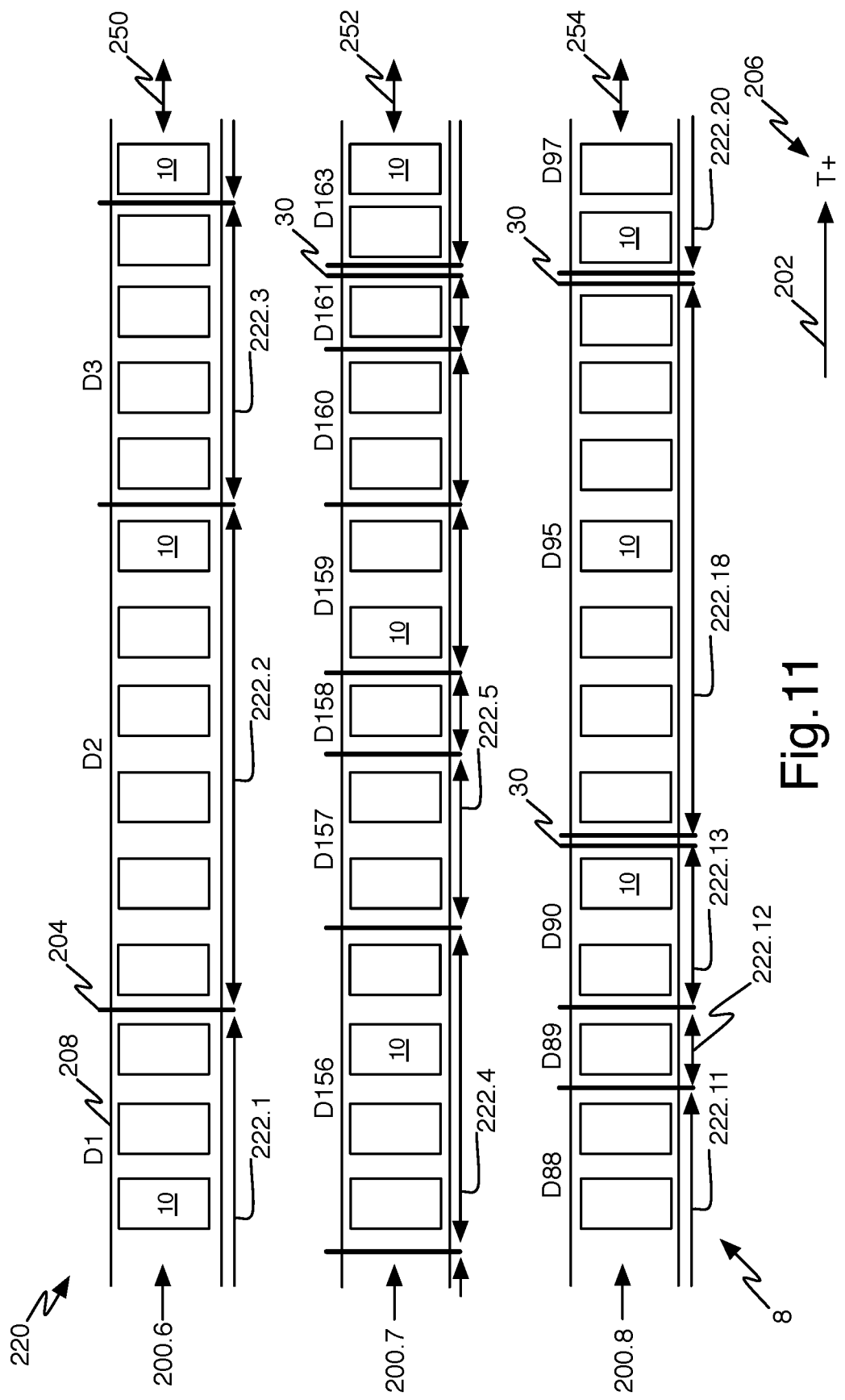
FIG. 11 is the schematic view of FIG. 10 with some invisible units of time.

Referring now to FIG. 11 one can appreciate the removal of particular time units. Time units D162 is now invisible and invisible unit of time time mark 30 identifies the location of the invisible time units. Array of documents 200.8 has two invisible unit of time time marks 30 because units of time D91-D94 and D96 are invisible. The same principle of invisibility is applied here on arrays of documents 200.6, 200.7, 2008 using a non-linear timescale 220.

Figure 12:
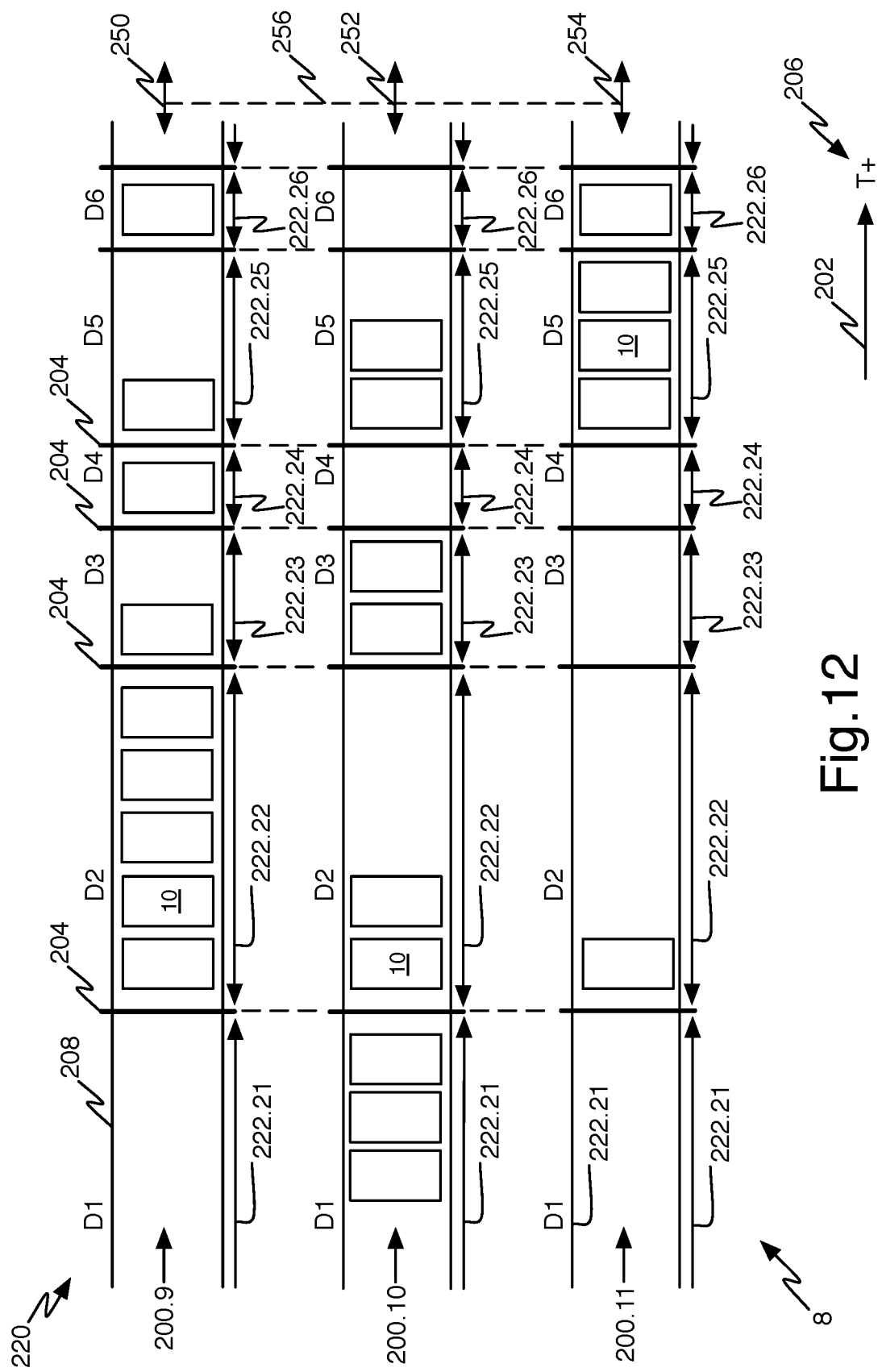
FIG. 12 is a schematic view of an illustrative graphical user interface displaying a plurality of arrays of documents along a non-linear timeline.

Embodiment Five—Arrays of Documents Using Non-Linear Timescales and Aligned Time Marks FIG. 12 illustrates another embodiment where the three arrays of documents 200.9, 200.10, 200.11 are using a shard non-linear timescale to display the documents along their timelines 202. On FIG. 12 however, despite a non-linear timescale is used, the time marks 204 are aligned across all arrays of documents 200.9, 200.10, 200.11. This is possible by grouping the three arrays of documents 200.9, 200.10, 200.11 and defining the length of each unit of time D* by using the longer length 222 needed across all the arrays of documents 200.9, 200.10, 200.11. In the illustrative example depicted by FIG. 12 unit of time D2 uses the length 222.22 based on the length needed to fit the five documents 10 on array 200.9. Unit of time D3 uses the length 222.23 based on the length needed to fit the two documents 10 on array 200.10, unit of time D4 uses the length 222.24 based on the length needed to fit a single document 10 on array 200.9 and unit of time D5 uses the length 222.25 based on the length needed to fit the three documents 10 on array 200.11. Unit of time D6 have the length of a single document 10 to accommodate one document located in two arrays 200.9, 200.11.

This type of presentation allows grouping and aligning the time marks 204 of a plurality of arrays of documents using a non-linear timescale 220. The save in display space is not as good as the previous embodiment however it might be more easy to see the same time period 222 on several arrays of documents 200 at once. The movement 250, 252, 254 along the timeline 202 of the arrays of documents 200.9, 200.10, 200.11 are preferably connected 256 so that all arrays are moving together to keep the time marks 204.

Embodiment Six—Combined View of Arrays of Documents Using Non-Linear and Non-Linear Timescales FIG. 13 illustrates a view of the interface presenting a plurality of arrays of documents 200.6, 200.7, 200.8, 200.12, 200.1, 200.2, 200.3. Arrays of documents 200.6, 200.7, 200.8 are using a non-linear timescale to display the documents along their time line 202. Conversely, arrays of documents 200.12, 200.1, 200.2, 200.3 are using a linear timescale to display the documents along their timeline 202.

Documents on the arrays of documents 200.6, 200.7 are smaller than the documents on arrays of documents 200.12, for instance, because it was desired to show more documents 10 on these arrays of documents despite the documents 10 are smaller. Arrays of documents 200.6 also illustrates a cut in the timeline 202 illustrated by the invisible unit of time time mark 30 where a unit of time 222 is invisible.

The time marks 204 on arrays of documents 200.6, 200,7, 200.8 are not aligned because, as explained earlier, they are not sharing the same linear timescale thus they have different unit of time 222 lengths.

Turning now to arrays of documents 200.12, 200.1, 200.2, 200.3 using a linear timescale. The units of time length 212.1 of the array 200.12 are longer than the unit of time length 212.3 used by the arrays 200.1, 200.2, 200.3 therefore less units of time will be displayed on the same display for array 200.12 and the time marks 204 cannot be aligned 262 or shared. However, arrays of documents 200.1, 200.2, 200.3 are using a common linear timescale 210 and can therefore share time marks 204 between them. The arrays can also be moved 250, 252, 254, 258, 260, individually, in groups or collectively 260, along the timeline 202. Arrays of documents 200.1, 200.2, 200.3 also illustrate a cut in the timeline 202 illustrated by the invisible unit of time time mark 30 where one or many units of time 212.3 are invisible in accordance with the desire of an hypothetical user.

All the arrays of documents illustrated on FIG. 13 can be reordered (i.e. vertically) to meet one's preferences. Spaces can be left between two arrays although they are all presented sharing no space therebetween on the illustrative FIG. 13.

All the arrays of documents can be displayed on the same "combined" time-space. Although, it might be desirable to separate each arrays of documents using a distinct timescale, for ease of use of the interface or for programming purpose, to group arrays of documents either using similar linear timescale or non-linear timescale. This grouping can also be made on the basis of the timescale used to distribute the documents 10 on the arrays of documents. Each group of arrays of documents will define a time-space because they all commonly share either the linearity of the timeline or they share the same unit of time length and can therefore share the time marks 204. This also allows a user to change the strength of the zoom (zoom-in/zoom-out) on only one time-space at the time, change the size of the documents, navigate through time 202 on a single time-space while the other time-spaces (or a single array of documents defining its own time-space) are kept still.

The use of various time-space can be made on a single display or on a plurality of displays. For example, each display could present a single time-space and navigate the arrays of documents more consistently. In the case where more than one time-space is displayed on a single display then they can appear with a gap therebetween, in different windows or simply using alternate views where each view display one time-space at the time and the switch between the views is made by actuating an icon or a predetermined set of keys on a keyboard.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon instructions that, when executed, provide a method of displaying images along a timeline, the method comprising:
   (a) displaying the images, associated with respective times, on an axis in different manners by switching between two different types of timescale used for a timeline of the axis, the two different types of timescales comprising a linear timescale and a nonlinear timescale;
   (b) wherein the displaying comprises,
      (i) displaying a plurality of the images on the axis with the timeline having a linear timescale by displaying images on the axis along the timeline together with a first plurality of time marks each identifying a change of year, the timescale of the displayed timeline having a time distribution that is constant, with equal periods of time being visually represented in analogous lengths of distance between consecutive yearly time marks along the axis, the axis displaying an analogous graphical spacing between adjacent images; and
      (ii) displaying a plurality of the images on the axis with the timeline having a non-linear timescale by displaying images on the axis along the timeline together with a second plurality of time marks each identifying a change of month, the timescale having a time distribution that is variable with one or more equal periods of time being visually represented in unequal lengths of distance between consecutive monthly time marks along the axis, the axis displaying the analogous graphical spacing between adjacent images between two consecutive monthly time marks, whereby the non-linear timescale is adapted to omit a time unit along the timeline.

2. The non-transitory computer-readable medium of claim 1, wherein the switching of the type of timescale of the axis between linear and nonlinear timescales in displaying images of the axis to the user is effected by input from the user.

3. The non-transitory computer-readable medium of claim 1, wherein at least some of the images are user-selectable.

4. The non-transitory computer-readable medium of claim 1, wherein at least some of the images are videos.

5. The non-transitory computer-readable medium of claim 1, wherein the images are arranged along the axis in a substantially rectilinear orientation.

6. The non-transitory computer-readable medium of claim 1, wherein at least some of the images are displayed in a plurality of sizes on the axis.

7. The non-transitory computer-readable medium of claim 1, wherein the time marks in the non-linear timescale are disposed between two adjacent images along the axis.

8. The non-transitory computer-readable medium of claim 1, wherein the method further comprises:
   changing the timescale of the timeline between the linear timescale and the non-linear timescale upon receiving a user input representing a change in the timescale between years and months.

9. The non-transitory computer-readable medium of claim 1, wherein the method further comprises:
   changing the timescale of the timeline between the linear timescale and the non-linear timescale upon receiving a user input representing a change in the timescale between years and days.

10. A computing device comprising a processor, a user display, and a non-transitory computer-readable medium containing computer-executable instructions for performing a method when executed by the processor, the instructions comprising:
    (a) displaying on the user display images, associated with respective times, on an axis in different manners by switching between two different types of timescale used for a timeline of the axis, the different types of timescales comprising a linear timescale and a nonlinear timescale;
    (b) wherein the displaying further comprises,
       (i) displaying a plurality of the graphical elements on the axis with the timeline having a linear timescale by displaying images on the axis along the timeline together with a first plurality of time marks each identifying a change of year, the timescale of the displayed timeline having a time distribution that is constant, with equal periods of time being visually represented in analogous lengths of distance between consecutive yearly time marks along the axis, the axis displaying an analogous graphical spacing between adjacent images; and
       (ii) displaying a plurality of the images on the axis with the timeline having a non-linear timescale by displaying graphical elements on the axis along the timeline together with a second plurality of time marks each identifying a change of month, the timescale having a time distribution that is variable, with one or more equal periods of time being visually represented in unequal lengths of distance between consecutive monthly time marks along the axis, the axis displaying the analogous graphical spacing between adjacent images between two consecutive monthly time marks, whereby the non-linear timescale is adapted to omit a time unit along the timeline.

11. The computing device of claim 10, wherein the switching of the type of timescale of the axis between linear and nonlinear timescales in displaying graphical elements to the user is effected by input from the user.

12. The computing device of claim 10, wherein the images are user-selectable.

13. The computing device of claim 10, wherein some of the images are videos.

14. The computing device of claim 10, wherein the images are arranged along on axis in a substantially rectilinear orientation.

15. The computing device of claim 10, wherein at least some of the images are displayed in a plurality of different sizes on the axis.

16. The computing device of claim 10, wherein the time marks in the non-linear timescale are disposed between two adjacent images on the axis.

17. The computing device of claim 10, wherein a time unit is omitted along the timeline in the non-linear timescale.

18. The computing device of claim 10, wherein the method further comprises:

changing the timescale of the timeline between the linear timescale and the non-linear timescale upon receiving a user input representing a change in the timescale between years and months.

19. The computing device of claim 10, wherein the images are displayed in a chronological order in a time unit.

20. A method of displaying images along a timeline, the method comprising:

(a) displaying the images, associated with respective times, on an axis in different manners by switching between two different types of timescale used for a timeline of the axis, the two different types of timescales comprising a linear timescale and a nonlinear timescale;

(b) wherein the displaying comprises, (i) displaying a plurality of the images on the axis with the timeline having a linear timescale by displaying images on the axis along the timeline together with a first plurality of time marks each identifying a change of year, the timescale of the displayed timeline having a time distribution that is constant, with equal periods of time being visually represented in analogous lengths of distance between consecutive yearly time marks along the axis, the axis displaying an analogous graphical spacing between adjacent images; and (ii) displaying a plurality of the images on the axis with the timeline having a non-linear timescale by displaying images on the axis along the timeline together with a second plurality of time marks each identifying a change of month, the timescale having a time distribution that is variable with one or more equal periods of time being visually represented in unequal lengths of distance between consecutive monthly time marks along the axis, the axis displaying the analogous graphical spacing between adjacent images between two consecutive monthly time marks, whereby the non-linear timescale is adapted to omit a time unit along the timeline.

* * * * *